United States Patent [19]
Barney

[11] 3,788,617
[45] Jan. 29, 1974

[54] CODED MAGNETIC CARD AND SYSTEM FOR ENCODING AND SENSING THE SAME

[76] Inventor: Walter W. Barney, 4837 Woodley Ave., Encino, Calif. 91316

[22] Filed: June 12, 1972

[21] Appl. No.: 261,886

Related U.S. Application Data

[63] Continuation-in-part of Ser. No. 56,326, July 20, 1970, which is a continuation-in-part of Ser. No. 745,876, July 18, 1968, abandoned.

[52] U.S. Cl...................235/61.12 M, 235/61.11 D, 340/174 PM, 346/74 M

[51] Int. Cl.. G06k 19/06, G11c 11/02, G01d 15/12

[58] Field of Search235/61.11 D, 61.12 M, 61.12 N; 346/74 M; 340/174.1 R, 149 A, 174 SP, 174 PM, 174 CC, 174 JA

[56] References Cited

UNITED STATES PATENTS

| | | | |
|---|---|---|---|
| 3,452,358 | 6/1969 | Zehner | 346/74 |
| 3,521,034 | 7/1970 | Mooers | 235/61.6 R |
| 2,105,291 | 1/1938 | Maul | 235/61.6 K |
| 3,632,995 | 1/1972 | Wilson | 235/61.12 N |
| 2,254,933 | 9/1941 | Bryce | 235/61.7 R |
| 3,154,761 | 10/1964 | O'Gorman | 340/149 A |

*Primary Examiner*—Daryl W. Cook
*Attorney, Agent, or Firm*—Ralph B. Pastoriza, Esq.; Pastoriza & Kelly

[57] ABSTRACT

A card is provided which includes a homogeneous sheet of magnetic material. The material and thickness of the magnetic sheet are such that portions may be permanently magnetized in a direction transverse to the plane of the sheet and with a polarity which cannot be disturbed except by directing magnetic flux in the opposite direction through the sheet. A plurality of such portions are permanently magnetized to provide a card with a plurality of magnetic poles at one face of one polarity or the other and distributed to code the card. In addition, a further irregular or random magnetizing pattern is imparted to the sheet, whereby the card magnetization is effectively scrambled to render the code undecipherable and unintelligible.

2 Claims, 15 Drawing Figures

CODED MAGNETIC CARD AND SYSTEM FOR ENCODING AND SENSING THE SAME

This application is a continuation-in-part of copending application Ser. No. 56,326, filed July 20, 1970, which in turn, is a continuation-in-part of application Ser. No. 745,876 filed July 18, 1968, both applications now abandoned.

BACKGROUND OF THE INVENTION

The invention relates to coded magnetic cards for use as credit cards, identification or security cards, or the like.

It is well known to provide cards with homogeneous layers which are magnetized at discrete locations to code the cards, and from which external elements are operated to develop signal information representing the code. However, the code in such a card is easily detectable by magnetic field tracing techniques. For example, magnetic ink spread over the card face reveals the position and size of the magnetized areas. With suitable magnetic polarity detectors, the card code may be easily deciphered.

The present invention is concerned with a card for use in conjunction with static reader apparatus, the card being formed with a homogeneous sheet of magnetic material embedded in a rubber or plastic base, and characterized in that magnetizing and magnetic material forms permanently magnetized portions which are poled along lines perpendicular to the card faces, and in which coded portions are obscured by their partial or total inclusion in larger magnetized portions of a magnetic matrix. In such a card, locations and sizes of the coded portions cannot be detected by unauthorized equipment.

DETAILED DESCRIPTION OF THE ILLUSTRATED EMBODIMENTS

Figure 1:
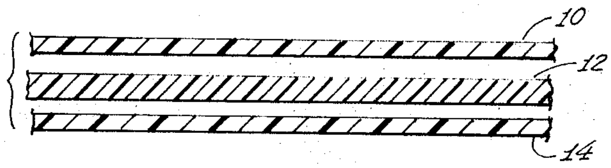
FIG. 1 is a fragmentary sectional view of three plastic layers forming the coded card of the invention, wherein the center layer is a sheet of homogeneous material adapted to be permanently magnetized.
Figure 2:
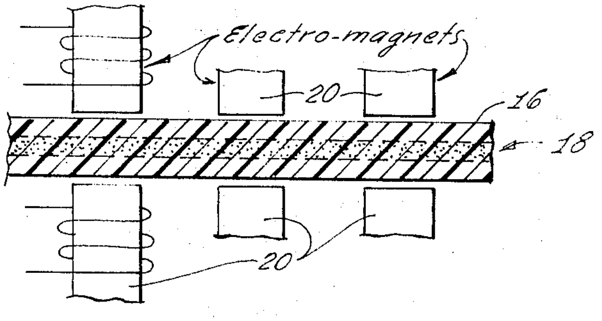
FIG. 2 is a fragmentary sectional view of a monolithic card made of the layers of FIG. 1, showing the cores of adjacent pairs of electro-magnets positioned for actually magnetizing circular portions of the center layer of the card.

Referring to FIGS. 1 and 2, a card constructed in accordance with the invention is formed of three sheets 10, 12 and 14, the middle sheet 12 of which is a homogeneous sheet with magnetic material distributed through the sheet. For example, the sheet 12 may be formed of barium ferrite in a rubber or plastic base. The outer sheets 10 and 14 are plastic, and the three sheets 10, 12 and 14 are bonded or fused together under suitable heat and pressure to form a monolithic card 16.

As shown in FIG. 2, the resulting card 16 has a center region 18 of magnetic material. Also, the thickness of this region 18 is a substantial fraction of the thickness of the card 16. For example, the card may have a thickness of 0.030 inches, formed from sheets 10, 12 and 14, all substantially 0.01 inches thick. The center sheet 12 may be thicker than the outer sheets 10 and 14.

It has been found that by providing the center sheet 12 of sufficient thickness and concentration of magnetic material, any portion of that sheet (or the center card region 18 resulting therefrom) can be magnetized to saturation along a line perpendicular to its face by way of the aligned magnetizing cores 20 (FIG. 2) of appropriate electro-magnets, and that such magnetized portions are permanently magnetized. That is, the polarities of such magnetized portions can be reversed, but only by similarly placing them between such cores 20, and by directing magnetic flux through the cores in the opposite direction. Further, the boundaries of such magnetized card portions are determined by the boundaries of the cores used to magnetize them. In this connection, the cores 20 may be circular, square, rectangular, or any desired cross-section. Such a magnetizing system is described, for example, in U.S. Pat. 3,471,862 which issued to the present inventor on Oct. 7, 1969.

Figure 5:
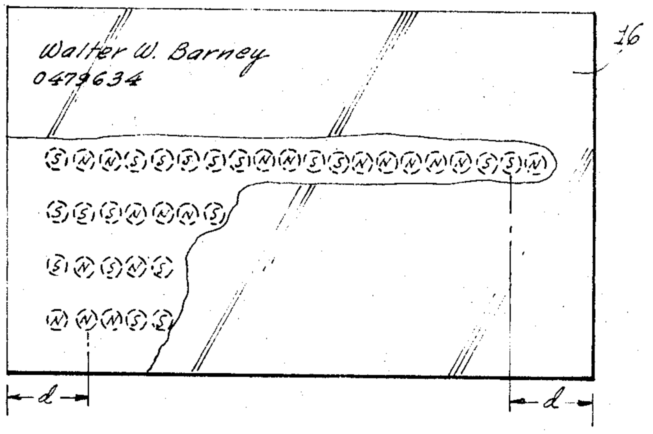
FIG. 5 is a fragmentary view of one face of the card of FIG. 4, illustrating the polarities at the face resulting from magnetizing discrete portions on each side of the aforesaid electro-magnets.

Preferably, the cores 20 of each aligned pair on opposite sides of the card 16 are the cores of electro-magnets having their coils wound and connected to establish aiding flux through the cores, and which can be selectively energized to magnetize the card portion between the cores with either desired magnetic polarity. The card 16 is placed between a plurality of aligned pairs of such cores, and the electro-magnets are simultaneously energized to permanently magnetize to saturation all card portions between the confronting ends of the paired cores 20. Thus, electro-magnets may be provided with coaxial cores arranged in a plurality of rows, for example, four rows of ten each, whereupon simultaneous energization of the electro-magnets creates forty saturized permanent magnet portions in the center region 18 of the card (FIG. 5).

Figure 3:
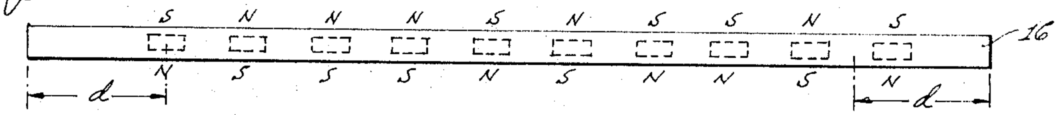
FIG. 3 is an edge view of a coded card made as indicated in FIG. 1, showing a row of discrete, axially magnetized areas which are formed upon placing the card in one position between the aligned cores of one row of electro-magnets.

FIG. 3 illustrates the card 16 as seen from one longitudinal edge thereof, wherein the discrete portions placed between the coaxial cores 20 of one row of electro-magnets have been magnetized. Such portions are indicated in dotted lines and are shown with polarity indications resulting from the manner in which the electro-magnets are wound and energized.

Figure 4:
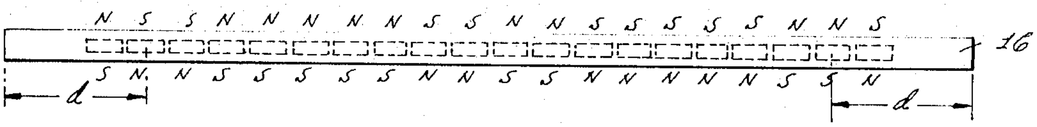
FIG. 4 is an edge view of the coded card of FIG. 2 after it has been reversed in position between the aligned cores of the same electro-magnets, so as to magnetize axially additional areas.
Figure 6:
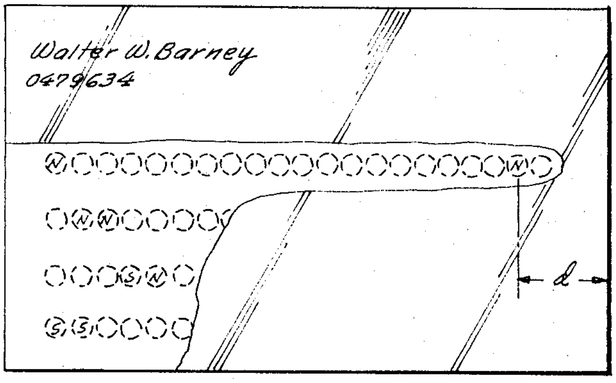
FIG. 6 is a fragmentary plan view like FIG. 4, wherein the polarities of four discrete portions in each master pattern are reversed to provide two codes.

With the magnetized card portions spaced apart a distance slightly greater than their diameters, the card can be reversed, or, if desired, shifted longitudinally, to place the intermediate unmagnetized portions between the coaxial cores 20. Upon energizing all electro-magnets, an additional four rows of permanent magnet portions is created, thus providing eighty such portions (see FIGS. 4 and 6). If one-half of the card is used for these magnetized portions, obviously the same procedure can be followed with the other half further to increase the density.

Such permanent magnet portions can thus be packed as closely as desired within the card 16, yet the field of each extends outside the card. That is, the field of adjacent permanent magnet portions cannot link up and be confined within the card as in the prior art magnetic cards. Thus, each permanent magnet portion can operate external magnet responsive devices, for example, switches with movable contacts in the form of magnets with which the magnetized card portions are aligned, as disclosed in my aforesaid Application Ser. No. 745,876.

As a further result of magnetizing card portions as above described, a single card is provided which can be coded in any of millions of ways. For example, the polarities of the magnetized portions in each card, (viewed from one face of the card) are distributed in accordance with a master pattern. Then the polarities of a predetermined number of such portions (for example four) are reversed as previously indicated, to be detected only by a decoder sensing means which responds to any four bit code within the overall master pattern.

The locations and sizes of the magnetized regions of the cards thus far described can readily be determined. However, it has also been found that all portions of the magnetic region 18 of the card may initially be randomly magnetized by appropriately shaped electro-magnets of a similar nature to the representation of FIG. 2, and then portions of that region may be magnetized at desired locations in accordance with a desired scheme. Thus, a portion magnetized in accordance with the desired scheme may have a polarity (at each face of the card) which is partly of the same and partly of the opposite in polarity of adjacent ones of the randomly magnetized portions. This arrangement adds a further obstacle to detecting the master pattern or code of the card.

Figure 7:
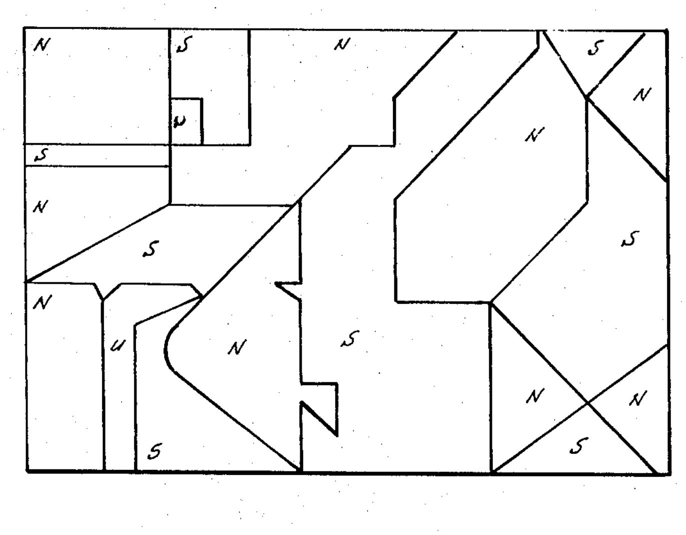
FIGS. 7, 8 and 9 are plan view of a magnetized card showing the steps in achieving the magnetizing concepts of the invention.

In this latter connection, FIG. 7 shows one face of a homogeneous sheet or card which is magnetized with a plurality of random magnetized and unmagnetized portions of varying irregular configurations, the magnetized portions being indicated by N or S to represent the magnetic polarities thereof, and the unmagnetized portions being indicated by U.

Figure 8:
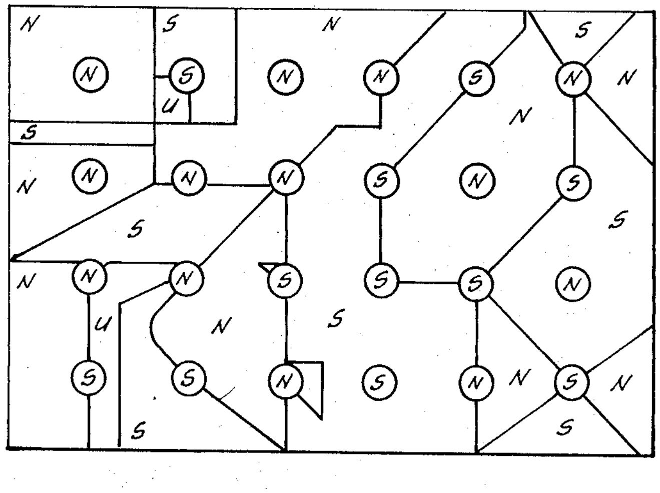

As a second step in the encoding process, and as shown in FIG. 8, a matrix comprising rows and columns of equally spaced circular magnetic portions of equal size are formed in the card by the techniques described above in conjunction with FIGS. 1–6. The circular portions have magnetic polarities at the card face, as represented in the circles in FIG. 8 by N or S, and are formed as a matrix on the card in accordance with the selected code.

When one of the circular magnetized portions of the matrix falls on the border between two of the magnetic portions of FIG. 7, the result is a polarity reversal of the part of the previously magnetized portion which is poled oppositely to the direction of the field forming the circular magnetic portion. However, the field producing the circular magnetic portion has no effect on the previously magnetized field of the same polarity, because the previously magnetized portion is magnetically saturated. Thus, the forming one of the circular magnetized portions of FIG. 8 at a boundary between two of the previously magnetized portions of FIG. 7, has the effect of altering the boundary so that the effective area of the previously magnetized portion of the same polarity is enlarged.

Further, by forming a circular magnetized portion of FIG. 8 completely within the boundary of one of the previously magnetized portions of FIG. 7 of opposite polarity, the polarity is reversed, so that a circular magnetized portion of opposite polarity appears within the boundary of the previously magnetized portion. However, if the previously magnetized portion happens to be of the same polarity as the circular magnetized portion, the original magnetization within that region is undisturbed because it is magnetically saturated.

Figure 9:
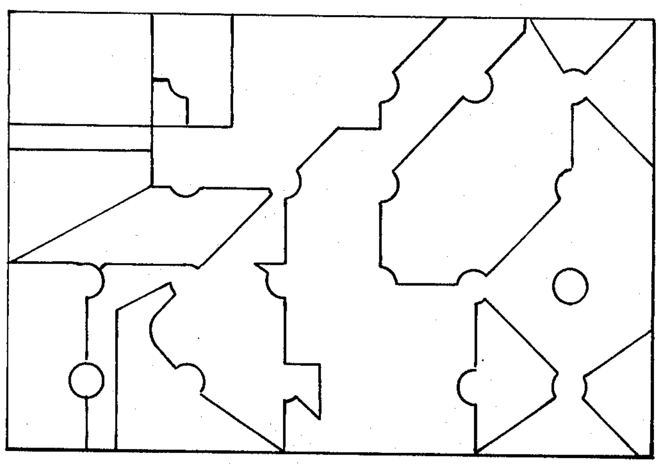

The net result of introducing the matrix of circular magnetized portions of the indicated polarity in FIG. 8 to the previously magnetized portions of the indicated polarity of FIG. 7, is shown in FIG. 9. FIG. 9, for example, shows the magnetic pattern which is revealed when a magnetic liquid is poured on the card surface. The rows and columns of the circular magnetic areas of FIG. 7 represent the actual code of the card. However, this code is effectively masked because many of the circular areas do not appear in the coded card as represented in FIG. 9, and parts of other circular areas become boundaries between the previously magnetized random areas.

Any unauthorized attempt to use the card of FIG. 9 is frustrated, for there is no way of determining the actual code which is incorporated into the card. For example, no effective reader or validator for the card can be constructed, because the unauthorized person does not know where to position the encoder sensors, or how large or how small the sensors should be to respond to the magnetic code which is hidden in the card of FIG. 9.

Specifically, it should be noted that for cards having portions coded into a magnetic pattern in accordance with the invention, and as shown in FIG. 9, each card has coded portions which are poled differently, so that for different cards having a random magnetic pattern such as shown in FIG. 7, the net result of the cards, as shown in FIG. 9, would be different for different codes on the card. Accordingly, even if a plurality of cards coded in accordance with the invention were obtained, it would not be economically possible to synthesize the necessary data to develop equipment which could validate the cards, or which would permit other cards to be encoded which would be passed by a validator capable of reading the code on the card of FIG. 9.

However, where a particular code is encoded into the card, as represented by the polarities illustrated in the circular portions, for example, of FIG. 8, such a code can be validated by equipment, such as described in U.S. Pat. No. 3,430,200 which issued Feb. 25, 1969 in the name of the present inventor, although no unauthorized person could determine the code beforehand, merely by an attempt to decipher the card of FIG. 9. Apparatus such as described in the said patent is shown, for example, in FIGS. 10–14.

Figure 10:
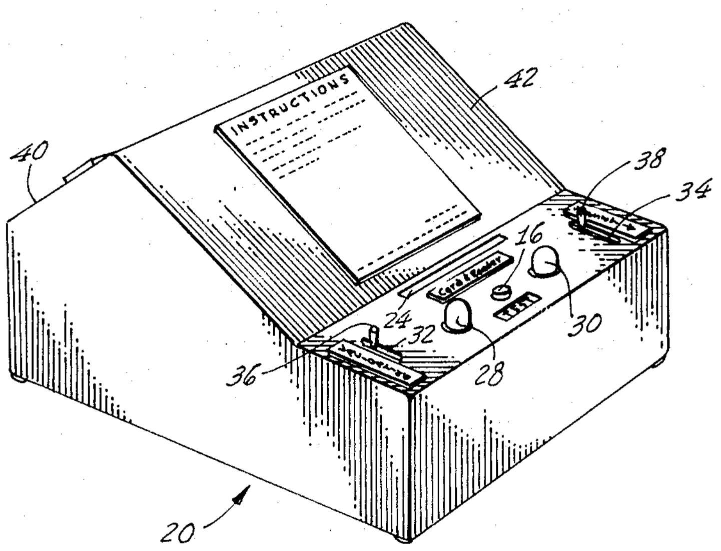
FIGS. 10 and 11 are perspective and rear elevations respectively of appropriate apparatus for sensing the coded card of the invention.
Figure 11:
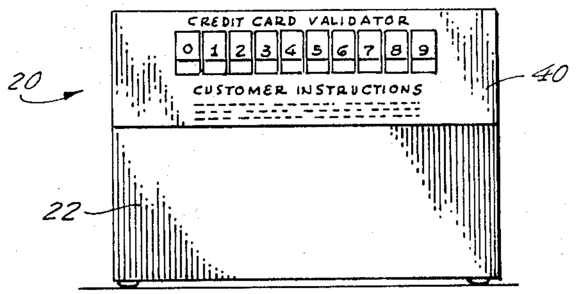

Referring to FIGS. 10 and 11, a validator 20 is provided which includes a housing 22 which at one end has a slot 24 to receive the magnetic card 16, coded, for example, in accordance with the representation of FIG. 9. At the other end of the housing and as shown in FIG. 11, for example, is a row of push buttons numbered 0, 1, 2 . . . 9. Near the slot 24 is a test button 26 for connecting a green lamp 28 and a red lamp 30 to a power source to determine their operability. Also located near the ends of the slot 24 are slots 32 and 34 through which the upper ends of respective validations check and reset levers 36, 38 extend. As shown, the upper ends of these levers are provided with knobs to permit them to be readily manipulated by hand.

The validator shown is adapted to be set on a counter top, with the portions including the slot 24 and the adjacent parts located nearest the person behind the counter, for example, the sales clerk. Therefore, the push buttons 0, 1, 2 . . . 9 are facing the customer, that is, the credit card holder. The customer gives his card to the clerk who inserts it into the slot 24. The clerk then presses the test button 26 to be sure the lamps 28 and 30 are operative, pulls the lever 38 to set the mechanism within the housing 22, and tells the customer to operate the push buttons in accordance with the customer's code. The customer has a specified push button code allocated to him, which is simple enough for a customer to remember. If, for example, the customer's code is the four digit number (0989), then the customer depresses the buttons "0," "9," "8" and "9" in that order. The clerk then actuates the validation check lever 36 by moving it along the slot 32, and this causes the green lamp 28 to glow.

If the customer does not depress the right push buttons in the proper sequence, the red lamp glows upon actuating the validation check lever 36. If this happens, the operator is thereby informed that the card in the slot 24 may not belong to that customer. In such a case, the clerk is on notice that goods or services to be performed with the credit card should not be sold to that customer.

Preferably, and as shown in FIGS. 10 and 11, the housing 22 is shaped so that the person behind the counter cannot see the push buttons, and hence cannot observe the number or sequence of the push buttons which the customer operates. On way to secure this advantage is shown in which the push buttons are mounted in a panel 40 which is hidden from the view of the person behind the counter. In this instance, the panel 40 is an inclined face of the housing 22 that faces the customer, and the upper edge of such panel forms an angle with another inclined face 42 that faces the person behind the counter.

while only ten push buttons are provided for operation by the customer as above described, as mentioned above, the coding of the cards of the invention is susceptible to so many variations, that it makes possible the validation and clearance of cards having millions of different codes. Further, the card of the invention makes it substantially impossible for one who finds or steals a credit card to decipher the code on the card, or to decode the card or operate the validator so as to make it appear that he is the owner of the card.

Figure 13:
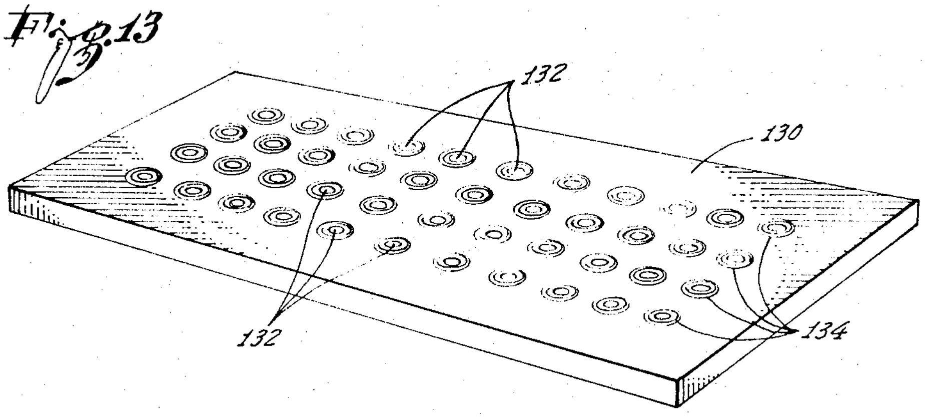
FIGS. 13 and 14 are perspective views of certain components of the sensing assembly of FIG. 12.
Figure 12:
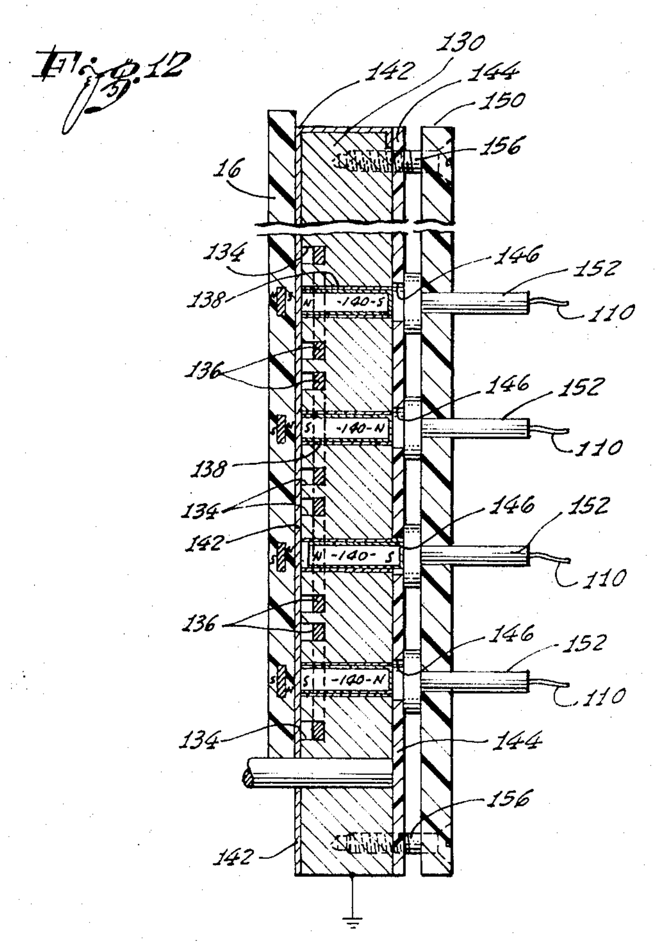
FIG. 12 is a section showing the magnetic sensing assembly used in the sensing apparatus.
Figure 14:
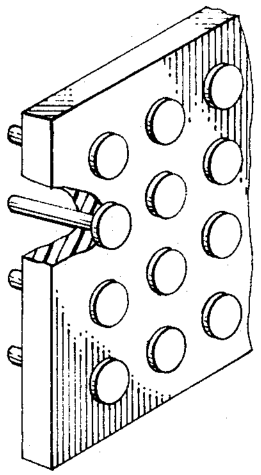

The magnetic sensor included in the apparatus of FIGS. 10 and 11 is shown, for example, in FIGS. 12–14. The magnetic sensor includes, for example, a plate 130 having openings 132 arranged in four rows of 10. Grooves 134 are formed in one face of the plate 130 around each opening 132, and a ring 136 of magnetic material, such as soft iron, is deposited in each groove. The wall of each opening 132 is plated, as with gold or silver indicated 138 in FIG. 12. Inserted in each opening 132 is a magnet 140, such magnet also being coded along its length and on the end opposite the grooves 134. The magnets are slidable in their openings.

After the magnets 140 are located in the openings 132, the face of the plate 130 in which the grooves 134 are located is covered with a sheet 142 of non-magnetic material, for example, a thin sheet of brass, or aluminum or plastic. Also, the opposite face of the plate 130 is covered with a sheet 144 of non-conductive material, for example, plastic, which has openings 146 aligned with the openings 132 in which the magnets 140 are located. The openings 146 are substantially larger in diameter than the plated magnets 140. Thus, the plated ends of the magnets 140 can readily move through the openings 146, and when such a magnet is repelled by a magnetic portion of the card 16, when the card is inserted alongside the fact sheet 142, as shown in FIG. 12.

In FIG. 12, the top two magnets 140, the bottom magnet 140, and the corresponding magnets in the card 16 are so poled that the magnets 140 are attracted by the magnets in the card, and are hence retained against the sheet 142. However, the third magnet in the card 16 has had its polarity reversed, for example, by initially magnetizing all the circular magnetic areas of FIG. 8 in a predetermined pattern, and then coding the card by reversing the polarities of selected ones of the circular magnetic portions. Accordingly, the third magnet 140 in FIG. 12 is repelled, so that the plated end thereof moves past the adjacent face of the plate 130 and through the adjacent opening 146 in the plastic sheet 144.

A magnet 140 that is subjected to such movement is brought into engagement with an electric contact. In this connection, and referring to FIG. 14 along with FIG. 12, a block 150 is provided in which a plurality of contacts 152 are embedded. As best shown in FIG. 12, each of the contacts 152 is formed as a short rod-like element that extends through the block 150, and which has an enlarged head, that is substantially larger in diameter than the openings 140 in the plastic sheet 144. The block 150 is fastened at 156 to the plate 130, so that the end faces of the heads of the contacts 152 are brought firmly into abutment with the adjacent face of the sheet 144. Thus, when a movable magnet 140 is repelled by a magnetic portion in the card 16, the plated end of the magnet comes into contact with the adjacent surface of the head of the contact 152. To enhance conductive contact, the enlarged heads of the contacts 152 may be similarly plated.

As will be observed, the magnets 140 are housed in a contaminant-free environment. The sheet 142 on the one face of the plate 130 covers the opening 132 in that face. The opposite ends of the magnets 140, the outer ends of the openings 146 are closed by the enlarged heads of the contacts 152. It will be apparent in FIG.

12 that the magnets are in conductive contact with the plate 130. Also, any magnet 140 that is moved into engagement with a fixed contact 152 establishes a conductive connection between the contact 152 and the plate 130. The plate is shown connected to a point of reference or ground potential, and leads 110 are conductively secured to the outer ends of the contacts 152, and are adapted for connection to additional switching circuits. The soft iron rings 136 in FIG. 12 serve to retract the extended magnets 140 into the plate 130 after the card 16 has been withdrawn, due to the attractive force between the iron ring 136 and the adjacent end of such magnet.

It will be realized that the operator does not actuate the validating switch 36 until the card 16 has been completely inserted into the slot 24 to assume the position shown in FIG. 12. At that position, the magnets 140 are repelled or attracted, in accordance with the code on the card, as established by the circular areas as shown in FIG. 8. Although some of the circular areas are masked and obliterated by the previously magnetized portions of FIG. 7 which have the same polarity, a sensing mechanism of FIG. 12 responds to the like polarity of the previously magnetized portion of FIG. 7, just as if it were the original circular magnetized portion of FIG. 8. Thus, although the code represented by the circular magnetized portions cannot be deciphered by an examination of the card of FIG. 9, the sensing mechanism of FIG. 12 is capable of providing an electric input corresponding to that code, when the card is inserted into the apparatus of FIGS. 10 and 11.

Figure 15:
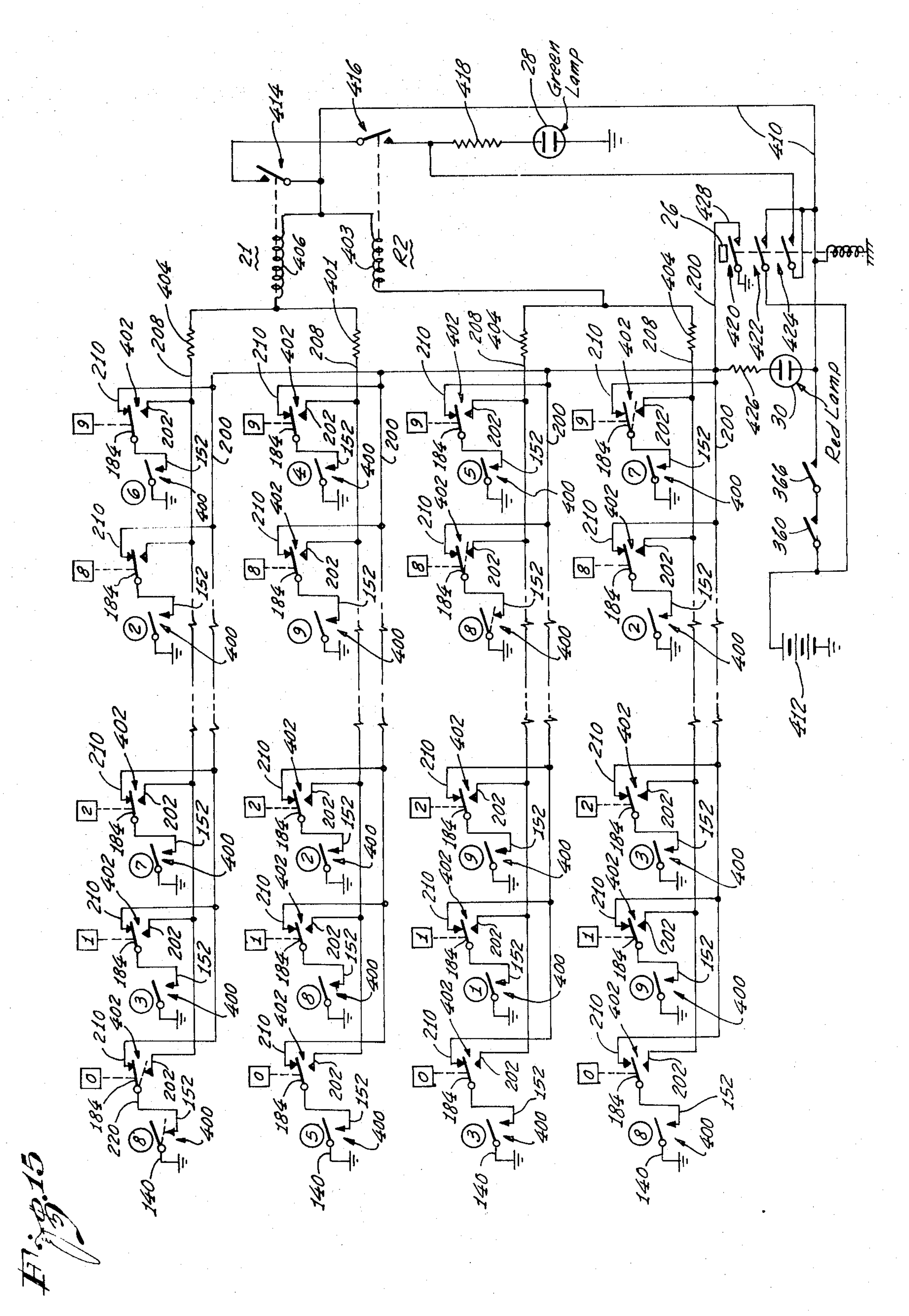
FIG. 15 is a circuit diagram of an electronic system included in the apparatus of FIGS. 10 and 11.

An appropriate electric circuit which responds to the sensor mechanism of FIGS. 12–14, and to the controls of the apparatus of FIGS. 10 and 11, is shown in FIG. 15. In FIG. 15, there is shown four rows of switches which correspond to the magnet switches and to the push button operated switches heretofore described. In each row are ten pairs of switches 400, 402, wherein the switches 400 are normally open, single-pole, single-throw switches representing the magnet switches, and the switches 402 are single-pole, double-throw switches representing the push button operated switches. As shown, the fixed contact of each switch 400 is connected to the movable contact of a respective switch 402.

To aid in understanding the circuit of FIG. 15, the switches 400 are exemplified as schematic representations of the magnet switches of FIG. 12, wherein the movable contact of each switch 400 represents respective magnet 140 in the plate 130 of FIG. 12, and the fixed contact represents the fixed contacts 152 in the plate 150.

As shown in FIG. 15, respective resistors 404 are connected to the busses 208. The resistors 404 in the top two rows are connected to one end of the coil 406 of a relay R1, and the resistors 404 in the bottom two rows are connected to one end of the coil 408 of a relay R2. The remaining ends of the coils 406, 408 are connected at 410 to the fixed contact of the switch 336. The movable contact of the switch 336 is connected to the fixed contact of the switch 360, and the movable contact of the switch 360 is connected to the positive terminal of a battery 412.

The relays R1, R2 control normally open switches 414, 416, wherein the movable contact of the switch 414 is connected to the junction of the coil 406, 408, the fixed contact of the switch 414 is connected to the movable contact of the switch 416, and the fixed contact of the switch 416 is connected to a resistor 418. The green lamp 18 of FIG. 1 is shown in FIG. 15 as a neon tube, and it is connected between the resistor 418 and ground. Thus, when the relays R1, R2 are energized, and the switches 414, 416 are closed, closure of the switches 360, 366, provides a completed direct current path from the positive terminal of the battery 412 through the switches and through the resistor 418 and the lamp 18 to ground.

Operation of the relays R1, R2, for the above-described purpose is effected by operating the push buttons 0, 1, 2 . . . 9 so that in successive rows only the switches 402 are actuated which have their corresponding magnet-operated switches 400 closed. In this connection, FIG. 15 shows push button 0, 1, 2 . . . 9 in each row that are connected to respective movable contacts 184 of the switches 402. While a separate row of push buttons 0, 1, 2 . . . 9 is shown in FIG. 30 for each row of switches 402, it will be understood that in the context of the preceding discussion, the "0" push buttons in FIG. 15 represent the single "0" push button in FIG. 11; the "1" push buttons in FIG. 15 represent the single "1" push button in FIG. 11; and so on.

The sequence of operation of the push buttons is one in which the movable contact 184 of the first switch 402 in the top row is switched to its corresponding fixed contact 202; the movable contact of the last switch 402 in the second row is switched to its first contact 202; the movable contact of the next to last switch 402 in the third row is switched to its fixed contact 202; and the movable contact of the last switch 402 in the bottom row is switched to its fixed contact 202. For the assumed sequence of operation of the push buttons 0, 1, 2, . . . 9, it is required that the card be coded so that in the corresponding rows of magnetic switches 400, the 8th, 4th, 8th and 7th magnet switches in the successive rows be closed. If the wrong push buttons are operated, or if the proper push buttons are operated in the wrong sequence, the actuation of the validation check lever 36 of FIG. 10 would not result in the green lamp 18 being illuminated. Rather, the red lamp 20 would be illuminated, thereby indicating that the person in possession of the card is not the rightful owner.

The operation of the circuit of FIG. 15 will first be described for the situation wherein the push buttons have been operated in the correct sequence. When the first push button "0" is depressed, the corresponding switch 402 is switched to its fixed contact 202. Thus, the adjacent end of the coil 406 and the associated resistor 404 are connected to ground through such "0"-operated switch 402, and the eighth switch of the corresponding row of magnet switches. When the second push button "9" is depressed, its corresponding switch 402 is switched to its fixed contact 202, and the adjacent end of the coil 406 and the second resistor 404 are connected to ground through the "9"-operated switch 402 and the fourth switch of the second row of magnet switches. When the push button "8" is pressed, this effectuates switching of the corresponding switch 402 to its fixed contact 202, to connect the associated resistor 404 and the adjacent end of the coil 408 of relay R2 to ground through the "8"-operated switch 402 and the eighth switch 400 of the corresponding row of magnet switches. Finally, operation of the fourth push button "9" similarly connects the remaining resistor 404 and the coil 408 to a parallel path to ground through the "9"-operated switch 402 and the seventh switch 400 the corresponding row of magnet switches.

Accordingly, when the validation check lever 36 of FIG. 2 is pulled to close the switch 366, each relay coil 406, 408 is connected to ground through a parallel resistive network. For each coil, the establishment of these parallel paths to ground is sufficient to energize the coil. Therefore, upon closure of the switch 366 by the validation check lever 36, the switches 414, 416 are closed, and the green lamp 18 is illuminated.

As shown in FIG. 15, the green lamp 18 and red lamp 20 are simultaneous illuminated upon operating the test button 26 in FIG. 10. Also, the red lamp 30 is illuminated following operations of successive push buttons whenever the wrong push button is pressed, or where any push button is pressed in the improper sequence. For test purposes, the push button 26 is adapted to close three normally open switches 420, 422, 424, the movable contacts of which are ganged for simultaneous operation by the push button 26. The red lamp 30 and a resistor 426 are serially connected between the lead 410 and one of the busses 200. As shown, all of the busses 200 are directly connected together. For the switch 420, its movable contact is connected to ground, and its fixed contact is connected at 428 to the bus side of the resistor 426.

The switch 422 has its movable contact connected to the positive terminal of the battery 412, and its fixed contact is connected both to the lead 410 and to the movable contact of the switch 424. As shown, the fixed contact of the switch 424 is connected to the junction of the resistor 418 and the fixed contact of the relay switch 416.

With the above-described arrangement, pressing the push button 16 to momentarily close the switches 420, 422, 424, simultaneously connects the red and green lamps 28, 30 and parallel across the battery 412. If any of the push buttons are incorrectly depressed, or operated out of sequence, the red lamp 30 is illuminated. Only when the proper push bottons are depressed in the proper sequence is the green lamp operated.

For a more complete description of the sensing mechanism and of the sensing circuit of FIG. 15, reference is made to the aforesaid U.S. Pat. No. 3,430,200.

The invention provides, therefore, a coded magnetic card which cannot be deciphered since the actual code sequence is masked by random magnetic patterns on the card. However, if the original code is known, the card itself can be validated and decoded by appropriate decoding apparatus, as described.

It will be appreciated that while a particular embodiment of the invention has been shown and described, modifications may be made. It is intended in the following claims to cover the modifications that come within the spirit and scope of the invention.

What is claimed is:

1. A magnetically coded card including a sheet of magnetic material characterized as a homogeneous sheet in which magnetic material is distributed throughout a plastic-like base, a. said sheet being permanently magnetized at a plurality of first portions having randomly shaped first areas over the face of the sheet, the first portions being magnetically poled along lines perpendicular to the opposite faces of the sheet, some of the first portions exhibiting north poles on one face and south poles on the opposite face and others of the first portions exhibiting south poles on one face and north poles on the opposite face, b. said sheet further including magnetized code bearing second portions having second areas smaller than said first areas and distributed over the face such that some of the second areas lie wholly within some of the first areas and others of the second areas intersect common boundaries of the first areas to lie partially in adjacent first areas, said second portions being magnetically poled along lines perpendicular to the opposite faces of the sheet, some of the second portions exhibiting north poles on said one face of the sheet and south poles on the opposite face and others of the second portions exhibiting south poles on the one face and north poles on the opposite face, such that any second area which lies wholly within a first area wherein the corresponding second portion exhibits the same pole as the first portion defining the first area, is undetectable whereby the particular arrangement and location of the magnetized code bearing second portions are undetectable in the absence of a previous knowledge of said particular arrangement and location as a consequence of the presence of said first portion.

2. A card according to claim 1, including in combination, two plastic sheets between which said homogeneous sheet is embedded to form a unitary card.

* * * * *